United States Patent [19]

Dosho et al.

[11] Patent Number: 5,495,296

[45] Date of Patent: Feb. 27, 1996

[54] DIGITAL SIGNAL PROCESSING CIRCUIT FOR FILTERING AN IMAGE SIGNAL VERTICALLY

[75] Inventors: Shiro Dosho; Tatsuro Juri, both of Osaka, Japan

[73] Assignee: Matsushita Electric Industrial Co., Ltd., Osaka, Japan

[21] Appl. No.: 59,561

[22] Filed: May 12, 1993

[30] Foreign Application Priority Data

May 19, 1992 [JP] Japan .................................. 4-125948
Apr. 22, 1993 [JP] Japan .................................. 5-095905

[51] Int. Cl.[6] .................................................. H04N 5/14
[52] U.S. Cl. .......................... 348/571; 348/607; 348/441
[58] Field of Search ........................ 358/138, 140, 358/141, 142, 160, 167, 11; 348/441, 443, 444, 445, 455, 458, 607, 609, 580, 571; H04N 7/01, 5/14, 9/64

[56] References Cited

U.S. PATENT DOCUMENTS

| | | | |
|---|---|---|---|
| 3,729,579 | 4/1973 | De Boer ..................................... | 358/11 |
| 4,051,516 | 9/1977 | Weston . | |
| 4,402,012 | 8/1983 | Knight ..................................... | 358/138 |
| 4,752,826 | 6/1988 | Barnett ..................................... | 348/441 |
| 4,768,093 | 8/1988 | Prodan ..................................... | 358/140 |
| 4,959,715 | 9/1990 | Prodan ..................................... | 358/138 |
| 4,967,263 | 10/1990 | Dieterich .................................. | 348/445 |
| 5,043,811 | 8/1991 | Yasuhiro ................................... | 358/140 |
| 5,067,010 | 11/1991 | Ishii et al. . | |

FOREIGN PATENT DOCUMENTS

| | | |
|---|---|---|
| 0424989A2 | 5/1991 | European Pat. Off. . |
| 0527023A2 | 2/1993 | European Pat. Off. . |
| 1326386 | 8/1973 | United Kingdom ................... 358/140 |

OTHER PUBLICATIONS

Van Buul et al., "Standards Conversion of a Videophone Signal with 313 Lines into a TV Signal with 625 Lines", Philips Res. Repts. 29, vol. 29, pp. 413–428, 1974.

Van Buul et al., "Standards Conversion of a TV Signal with 625 Lines into a Videophone Signal with 313 Lines", Philips Res. Repts. 28, pp. 377–390, 1973.

Devereux et al., "Pulse–Code Modulation of Video Signals: Codes Specifically Designed for PAL", Proc. IEE, vol. 125, No. 6, pp. 591–598.

*Primary Examiner*—James J. Groody
*Assistant Examiner*—Chris Grant
*Attorney, Agent, or Firm*—Willian Brinks Hofer Gilson & Lione

[57] ABSTRACT

In order to thin an input signal a second multiplexer is switched to output an output of a first adder and a third multiplexer is switched to output an output of a second adder, and a first multiplexer is alternatively switched at every line. A delay circuit memorizes the sum of the two preceding input signals, and the second adder outputs at every other line the sum of image data of a present line and the two preceding lines. To interpolate an input signal, the second multiplexer is switched to output the output of the delay circuit, the first multiplexer is alternatively switched to output either the input signal or the output of the second multiplexer, and the second multiplexer is alternatively switched to output either the output of the first adder or the output of the delay circuit. Thus, the delay circuit outputs at every other line the sum of the two preceding input signals. Because only one delay circuit is needed the size of the perpendicular thinning/interpolation circuit for an image signal is reduced.

10 Claims, 13 Drawing Sheets

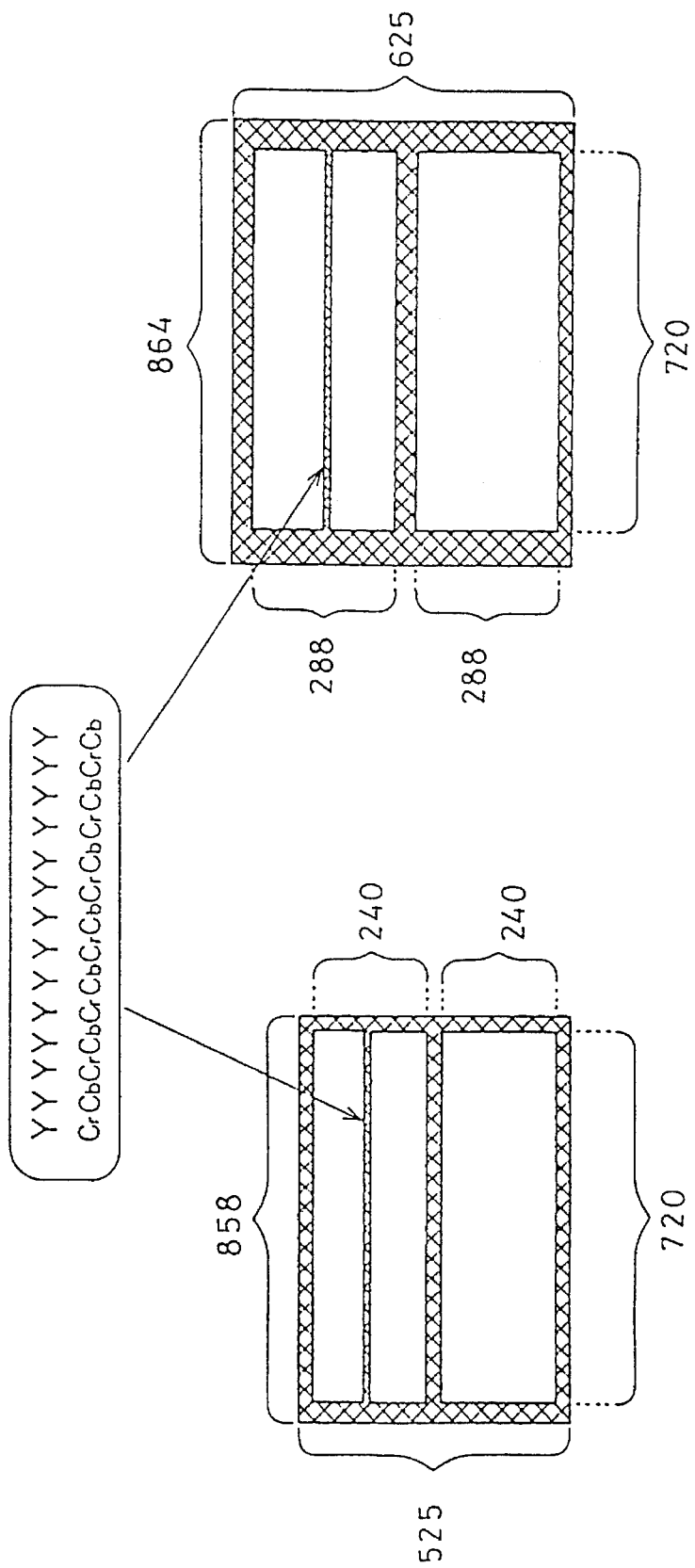

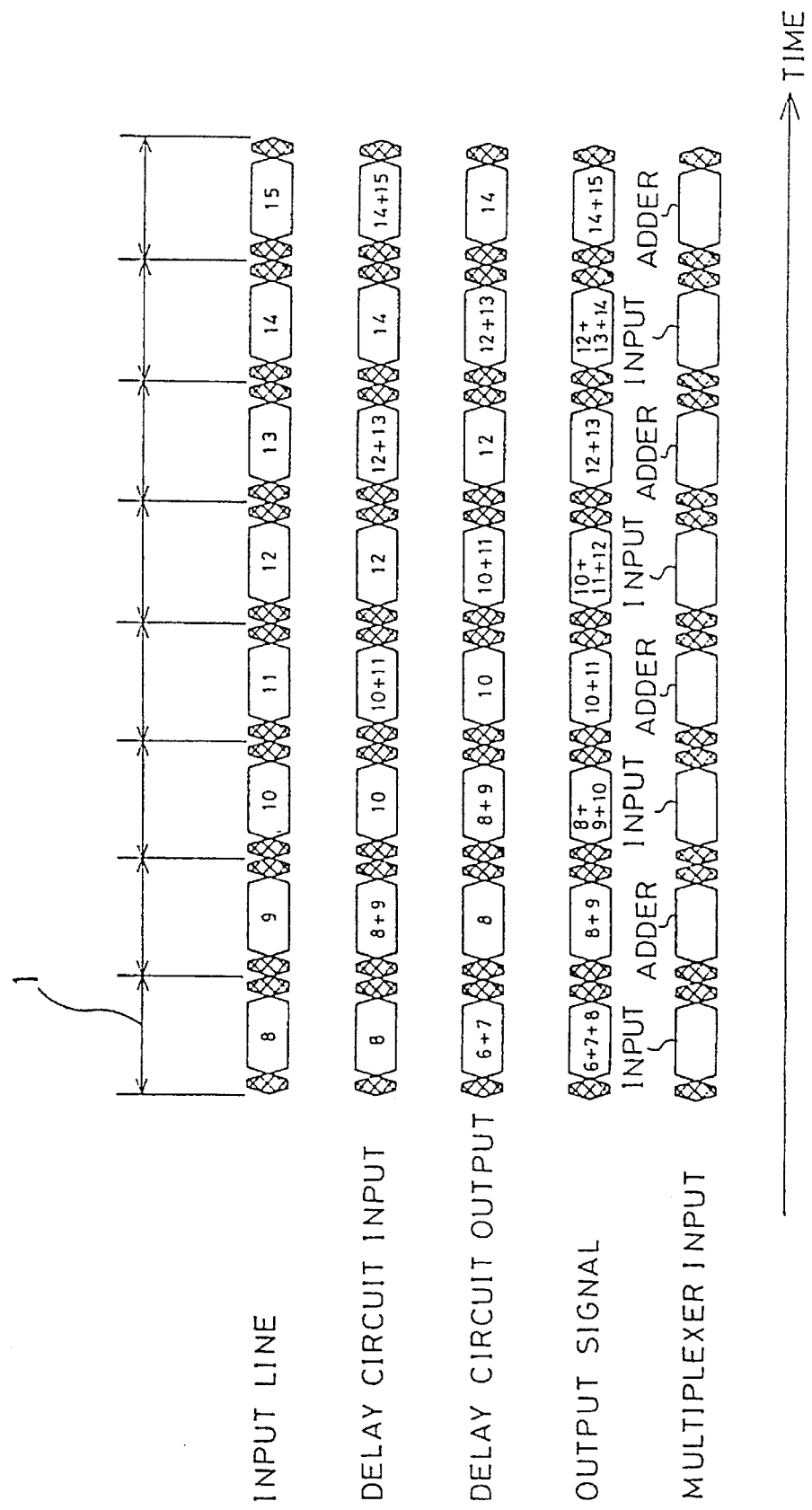

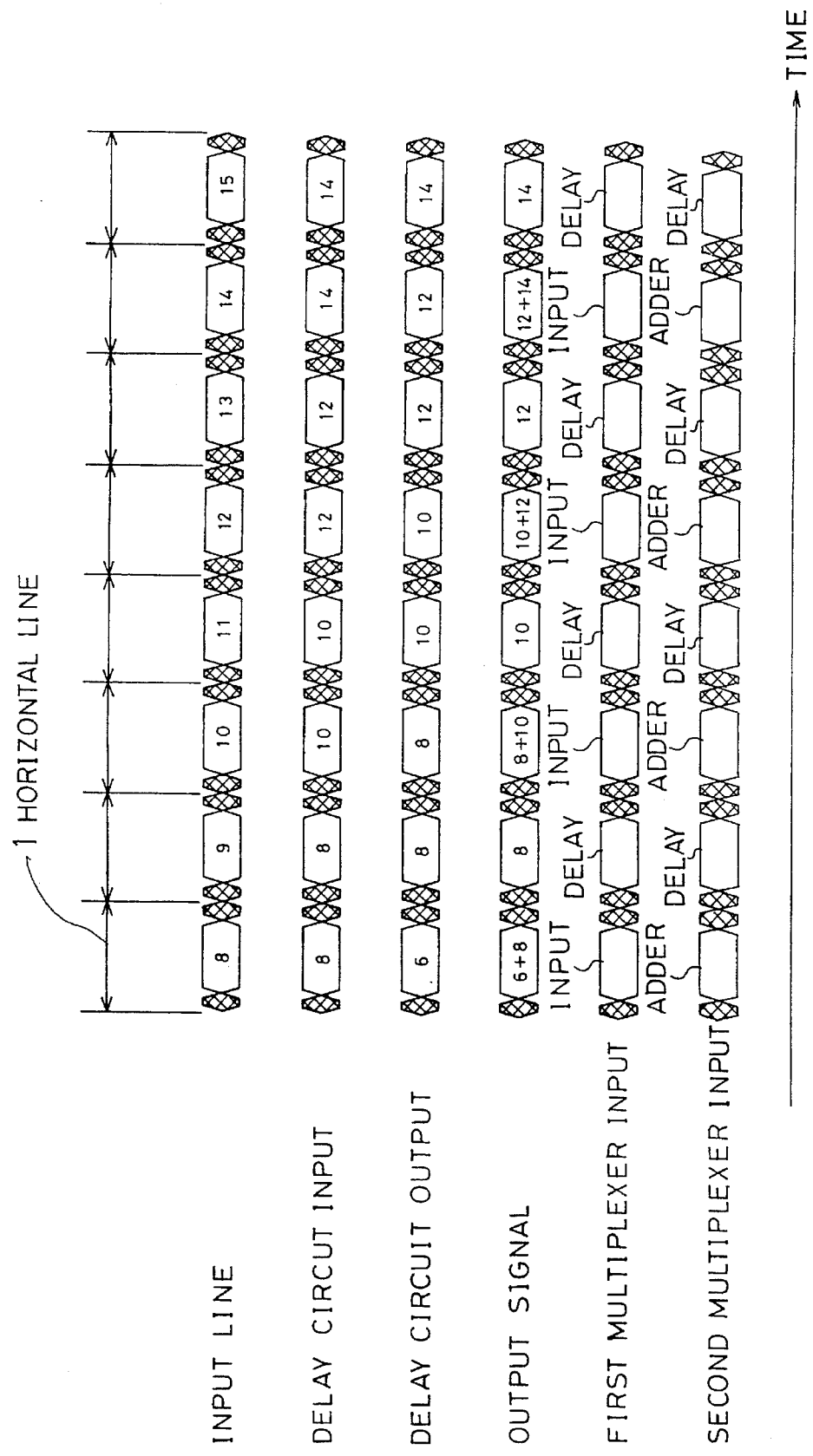

FIG.11(a)

SELECTOR CONTROL SIGNAL AT THINNING

| PERPENDICULAR LINE OF EFFECTIVE IMAGE | h2 | s5 | h5 |
|---|---|---|---|
| 0 | 1 | 0 | 0 |
| 1 | 0 | 0 | 1 |
| 2 | 1 | 0 | 1 |
| 3 | 0 | 1 | 1 |
| 4 | 1 | 0 | 0 |
| 5 | 0 | 1 | 1 |
| 6 | 1 | 0 | 0 |
| ... | | | |
| 288 | 1 | | |
| 289 | 1 | | |
| 290 | 1 | | |

FIG.11(b)

SELECTOR CONTROL SIGNAL AT INTERPOLATION

| PERPENDICULAR LINE OF EFFECTIVE IMAGE | s5 and h2 | h5 |
|---|---|---|
| 0 | 1 | 0 |
| 1 | 0 | 1 |
| 2 | 1 | 1 |
| 3 | 0 | 1 |
| 4 | 1 | 0 |
| 5 | 0 | 1 |
| 6 | 1 | 0 |
| ... | | |
| 288 | 1 | |
| 289 | 1 | |
| 290 | 1 | |

FIG.12

| PERPENDICULAR LINE OF EFFECTIVE IMAGE | THINNING | | | INTERPOLATION | | |
|---|---|---|---|---|---|---|
| | FIFO INPUT | FIFO OUTPUT | OUTPUT SIGNAL | OUTPUT SIGNAL | FIFO INPUT | FIFO OUTPUT |
| 1 | $R_1$00 | / | / | $OR_1$0/4 | $R_1$00 | / |
| 2 | $R_2$00 | $R_1$00 | $R_1$ | $R_1$ | $R_1$00 | $R_1$00 |
| 3 | $OR_3$0 + $R_2$ | $R_2$00 | / | $\frac{OR_30 + OR_10}{4}$ | $R_3$00 | $R_1$00 |
| 4 | $R_4$00 | $OR_3$0 + $R_2$ | $\frac{R_2 + OR_30 + R_4}{4}$ | $R_3$ | $R_3$00 | $R_3$00 |
| 5 | $OR_5$0 + $R_4$ | $R_4$00 | / | $\frac{OR_30 + OR_50}{4}$ | $R_5$00 | $R_3$00 |

DIGITAL SIGNAL PROCESSING CIRCUIT FOR FILTERING AN IMAGE SIGNAL VERTICALLY

BACKGROUND OF THE INVENTION

This invention relates to a digital signal processing circuit for filtering of thinning and interpolating an image signal to be compressed and recorded as a digital signal.

Throughout the specification, the term thinning and interpolating are used to represent different types of vertical filtering.

It is well known that of an image signal to be input is compressed and recorded as a digital signal. Particularly, where an image signal is recorded as a digital signal to a videotape for general use, the information must be compressed to one tenth. In general, for compression of the image signal, which is composed of the luminance signal and the color-difference signals, the color-difference signals are compressed.

Generally, in the United States and Japan, the NTSC method is used for signal transmission; in Europe, the PAL method is the most commonly used signal transmission method. Since each method has a different transmission system for the luminance signal and the color-difference signals, each method has a different compression method for compressing the image signal (mainly the color-difference signals). The transmission systems For the luminance signal and the color-difference signals at one image in the NTSC method and the PAL method are respectively shown in FIGS. 4(a) and (b). In the respective methods, a signal at one image is generally composed of luminance signals Y and two kinds of color-difference signals Cr and Cb. The color-difference signals Cr, Cb are distributed alternatively in the horizontal direction of the image. The number of horizontal picture elements of the luminance signal Y is 858 in the NTSC method and 864 in the PAL method. The number of perpendicular lines is 525 in the NTSC method and 625 in the PAL method. The image signal is generally compressed in such a manner that the color-difference signals Cr and Cb are thinned with a signal rate of ½, the thinned color-difference signals Cr and Cb are serially translated according to DCT (discrete cosine transform) or the like together with the luminance signal Y, then a sign indicating the serially translated signal is translated so as to be a sign whose entropy is minimum. For thinning with the signal rate of ½, the color-difference signals Cr and Cb are thinned in the horizontal direction of the image as shown in FIG. 5(a) in the NTSC method, and the color-difference signals Cr and Cb are individually thinned in a perpendicular direction at every two lines as shown in FIG. 5(b) in the PAL method. The reason the color-difference signals Cr and Cb are thinned in the perpendicular direction of the image in the PAL method is because it is hard to cause degradation of the quality of the image because the perpendicular lines in the image in the PAL method are 100 lines more than that in the NTSC method.

When the color-difference signals are thinned, the picture element value before thinning is not used directly as a color-difference signal value (picture element value) Y after thinning, but the color-difference signal value Y after thinning is obtained by reflecting three successive picture element values before thinning to the picture element value Y after thinning. A formula (1) for calculating the picture element value Y is often used.

$$Y = X_2/4 + z^{-1}X_1/2 + z^{-2}X_0/4 \quad (1)$$

$X_n$: picture element value of the input signal
$z^{-1}$: delay of z-field
(NTSC method: one picture element)
(PAL: one horizontal line)

In the case where the thinned image signal is recorded to a tape or the like and the recorded thinned signal is regenerated, it is necessary to interpolate between the recorded color-difference signals. The picture element value Y of an interpolated color-difference signal located between the recorded color signals (thinned signals) is generally calculated with formula (2) below, using successive thinned signals ($X_1$ does not exist in formula (2)).

$$Y = X_2/2 + z^{-2}X_0/2 \quad (2)$$

$X_n$: picture element value of the input signal
$z^{-1}$: delay of z-field
(NTSC method: one picture element)
(PAL method: one horizontal line)

In order to put formulas (1), (2) into practice, generally the input signal is delayed by two delay circuits D provided as shown in FIGS. 6(a) and (b).

With the constructions for signal thinning in FIG. 6(a) and for signal interpolation in FIG. 6(b), however, the circuit size is enlarged in the PAL method, while the circuit size is small in the NTSC method.

In detail, in the NTSC method, when three successive color-difference signals are sequentially input the picture element value after thinning is calculated using formula (1) because the color-difference signal is thinned in the horizontal direction of the image. Thus, only two delay circuits for one picture element (usually two D flip-flops) suffice. In the case of interpolation using the signal after thinning, when two thinned signals are input sequentially, the picture element value after interpolation is calculated using formula (2). Thus, only two delay circuits for one picture element suffice as well as for the thinning. On the other hand, in the PAL method in which the color-difference signal is thinned in the perpendicular direction of the image, the picture element value after thinning is calculated using formula (1), only when the color-difference signals of three successive lines are sequentially inputted. Also, for the interpolation, the picture element value after interpolation is calculated using formula (2), only when the color-difference signals of two lines after thinning are input sequentially. Therefore, two delay circuits for storing and delaying the color-difference signals by one line are required. In detail, as shown in FIG. 4(b), since the number of effective picture elements for one line is 720 (excluding 144 picture elements corresponding to an eclipsing region from all of 864 picture elements in one line) in the PAL method, two 360-stage FIFO memories (first in first out buffer memory) are usually required for the color-difference signal Cr and the color-difference signal Cb respectively. This causes the circuit to be enlarged. The circuit is enlarged not only in the PAL method, but also when an image signal is thinned in the perpendicular direction for recording and the thinned signal is interpolated at regeneration of the recorded image signal.

SUMMARY OF THE INVENTION

The present invention has as its object providing a digital signal processing circuit for thinning or interpolating an image signal in the perpendicular direction in the PAL method, or the like, using fewer FIFO memories and having a reduced size.

To attain these objects, in the present invention, in a perpendicular thinning circuit of an image signal, two successive values of the color-difference signal are added and stored in a single delay circuit, instead of each being stored individually in two delay circuits. Further, in the perpendicular interpolation circuit of the image signal, an identical image signal is re-delayed by a single delay circuit, instead of delay by two delay circuits. Thus, the two delay circuits which store picture elements for one line in a conventional device are reduced to one circuit, thus reducing the size of the digital signal processing circuit.

In detail, according to a first embodiment, a digital signal processing circuit for producing a thinned signal of an input signal comprises: a first adder, a second adder and a multiplexer to which the input signal is input, an output of the first adder being input to the multiplexer, and the second adder producing the thinned signal; a delay circuit to which an output of the multiplexer is input, an output of the delay circuit being input to the first adder and the second adder; and control means for switching the multiplexer to output either the input signal or the output of the first adder.

According to a second embodiment, digital signal processing circuit for producing an interpolation signal of an input signal in the present invention comprises: a First multiplexer and an adder to which the input signal is input; a delay circuit to which an output of the first multiplexer is input, an output of the delay circuit being input to the first multiplexer and the adder; a second multiplexer to which an output of the adder and the output of the delay circuit are input, the multiplexer producing the interpolation signal; first control means for switching the first multiplexer to output either the input signal and or output of the delay circuit; and second control means for switching the second multiplexer to output the output of the adder when the first multiplexer is switched to output the input signal and for switching the second multiplexer to output the output of the delay circuit when the first multiplexer is switched to output the output off the delay circuit.

Further, in the present invention a digital signal processing circuit for producing a thinned signal and an interpolated signal of an input signal comprises: a first adder, a first multiplexer and a second adder to which the input signal is input; a delay circuit to which an output off the first multiplexer is input, an output of the delay circuit being input to the first adder and the second adder; a second multiplexer to which the output of the delay circuit and the output of the first adder are input, an output of the second multiplexer being input to the first multiplexer; a third multiplexer to which the output of the delay circuit and the output of the second adder are input; first control means for switching the second multiplexer to output either the output of the first adder or the output of the delay circuit; second control means for switching; the first multiplexer to output either the input signal or the output of the first adder; and third control means for switching the third multiplexer to output the output of the second adder when the first multiplexer is switched to output the input signal and for switching the third multiplexer to output the output of the delay circuit when the first multiplexer is switched to output the output of the second multiplexer, wherein the output of the third multiplexer is the thinned signal when the second multiplexer is switched to output the output of the first adder, and the output of the third multiplexer is the interpolation signal when the second multiplexer is switched to output the output of the delay circuit.

The digital signal processing circuit in the present invention is used for an image signal of a television in the PAL method.

Under the above construction, in the present invention, when an input signal is thinned according to switching of the multiplexer, instead of having the input signal stored in two delay circuits, only one delay circuit stores the result of the delayed input signal data and the present input signal. Thus, the circuit size is reduced with only one delay circuit.

Also, when an input signal is interpolated according to switching of first and second multiplexers, instead of having the input signal delayed by two delay circuits, input signal data delayed by the single delay circuit is delayed by the same delay circuit. Thus, the circuit size is reduced with only one delay circuit.

When an input signal is thinned according to switching of the third multiplexer, the sum of the delayed input signal data and the present input signal is stored in the single delay circuit, as in the first embodiment. When an input signal is interpolated according to switching of the third multiplexer, the delayed input signal data by the single delay circuit is delayed by the same delay circuit, as in the second embodiment. Consequently, only one delay circuit performs at both thinning and interpolation of the input signal, which leads to further reduction of the circuit size with only one delay circuit.

Further, the digital signal processing circuit is used as a circuit for thinning and interpolating an image signal of a television in the PAL method.

Consequently, according to the digital signal processing circuit in the present invention, when an image signal is compressed and recorded by thinning in the perpendicular direction of the image, the delay circuit stores the added result of two delayed image signals, instead of the delay circuit merely storing the delayed image signal. When the thinned signal is interpolated at regeneration of the thinned image signal, the delay circuit delays and stores the image signal delayed using the same delay circuit. Therefore, only one delay circuit for storing picture elements for one line suffices, thus reducing the circuit size. Particularly, when perpendicular thinning and interpolation for an image signal are conducted in a single circuit, the construction is simplified because of common use of electronic components such as the delay circuit.

The above objects and novel features of the present invention will appear more fully during the following description with reference to the accompanying drawings.

BRIEF DESCRIPTION OF THE DRAWINGS

The accompanying drawings show preferred embodiments of the present invention, in which:

FIGS. 4(a) and 4(b) are explanatory drawings respectively showing an image signal form in the NTSC method and the PAL method;

FIG. 7 is an explanatory drawing showing circuit operation in the first embodiment of the present invention;

FIG. 8 is an explanatory drawing showing circuit operation in the second embodiment of the present invention;

FIGS. 11(a) and (b) are tables respectively showing relationship between a control signal and a perpendicular line of an effective image in the digital signal processing circuit at thinning and at interpolation in the fourth embodiment of the present invention.

FIG. 12 is a table showing flow of an image signal in the digital signal processing circuit in the fourth embodiment of the present invention.

PREFERRED EMBODIMENTS OF THE PRESENT INVENTION

Described below are the preferred embodiments of the present invention with reference to the accompanying drawings.

Figure 1:
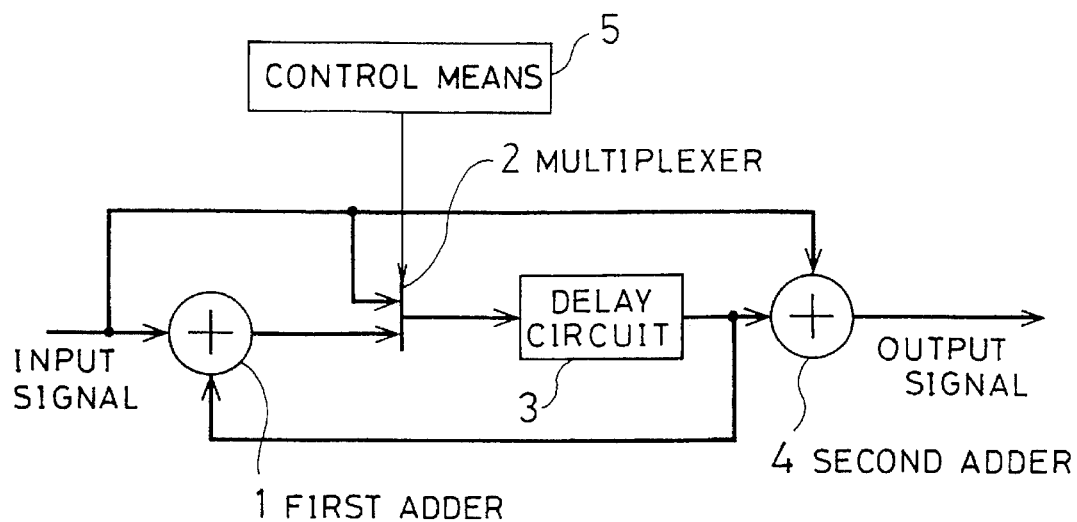
FIG. 1 is a block diagram showing a construction of a digital signal processing circuit according to a first embodiment of the present invention.

FIG. 1 is a block diagram showing a construction of a digital signal thinning circuit according to a first embodiment of the present invention. Reference numeral 1 indicates a first adder, 2 is a multiplexer, 3 is a delay circuit, 4 is a second adder, and 5 is a control means for controlling the multiplexer 2. The first adder, 1 adds the input signal and an output of the delay circuit 3. The multiplexer 2 receives the input signal and the output of the first adder 1 and selects for output either the input signal or the output of the first adder 1. The output of the multiplexer 2 is inputted to the delay circuit 3. The delay circuit 3 stores the input at every input and outputs a previously stored signal. The output of the delay circuit 3 is input to the first adder 1 and the second adder 4. The second adder adds the output of the delay circuit 3 and the input signal. The control means 5 alternatively switches the multiplexer 2 to output either the input signal or the output of the first adder 1.

The operation for thinning an image signal in a perpendicular direction to an image, using the digital signal thinning circuit is described with reference to FIG. 7. With respect to "MULTIPLEXER INPUT" in FIG. 7, "INPUT" means an input signal and "ADDER" means the first adder 1 in FIG. 1.

With respect to the first horizontal line (eighth line in FIG. 7), the multiplexer 2 is set to output the input signal, so that image data of the eighth line is stored in the delay circuit 3. The output of the digital signal thinning circuit, i.e., the output of the second adder 4 is the sum of the signal stored in the delay circuit 3 and the input signal. In the case where no signal is stored in the delay circuit 3, the output of the second adder 4 is the input signal itself of the eighth line. Usually, as shown in FIG. 7, the sum of the image data of a sixth line and a seventh line is stored, thus the sum of the sum in the delay circuit and the input signal is output.

With respect to the next horizontal line (ninth line in FIG. 7), the delay circuit 3 outputs the image data of the eighth line to the first adder 1 and the second adder 4. The first adder 1 adds tile image data of the eighth line from the delay circuit 3 and the image data of the ninth line. Since the multiplexer 2 is switched to output tile output of the first adder 1, the sum of the image data of the eighth line from the first adder 1 and the input signal of the ninth line is input to the delay circuit 3, and the output of the digital signal thinning circuit, i.e., the output of the second adder 4 is the sum of the image data of the eighth line and the input signal of the ninth line. Yet, the output is not used as a thinned signal.

With respect to the next line (tenth line in FIG. 7), the multiplexer 2 is set to output the input signal. Accordingly, the delay circuit 3 stores the input signal of the tenth line and outputs the sum of the image data of the eighth line and the ninth line. Then, the second adder 4 outputs the sum of the sum of the image data of the eighth line and the ninth line from the delay circuit 3 and an input signal of the tenth line. The data is output as a thinned signal. Thus, as shown in FIG. 7, unless the data is the first data of the image, the data stored in the delay circuit 3 is the data of the present line or the sum of the data of the present line and the data of the preceding line at every two lines. Accordingly, the digital signal thinning circuit outputs the sum of the image data of three lines at every two lines, thus the image signal is thinned in a perpendicular direction to the image.

Figure 1A:
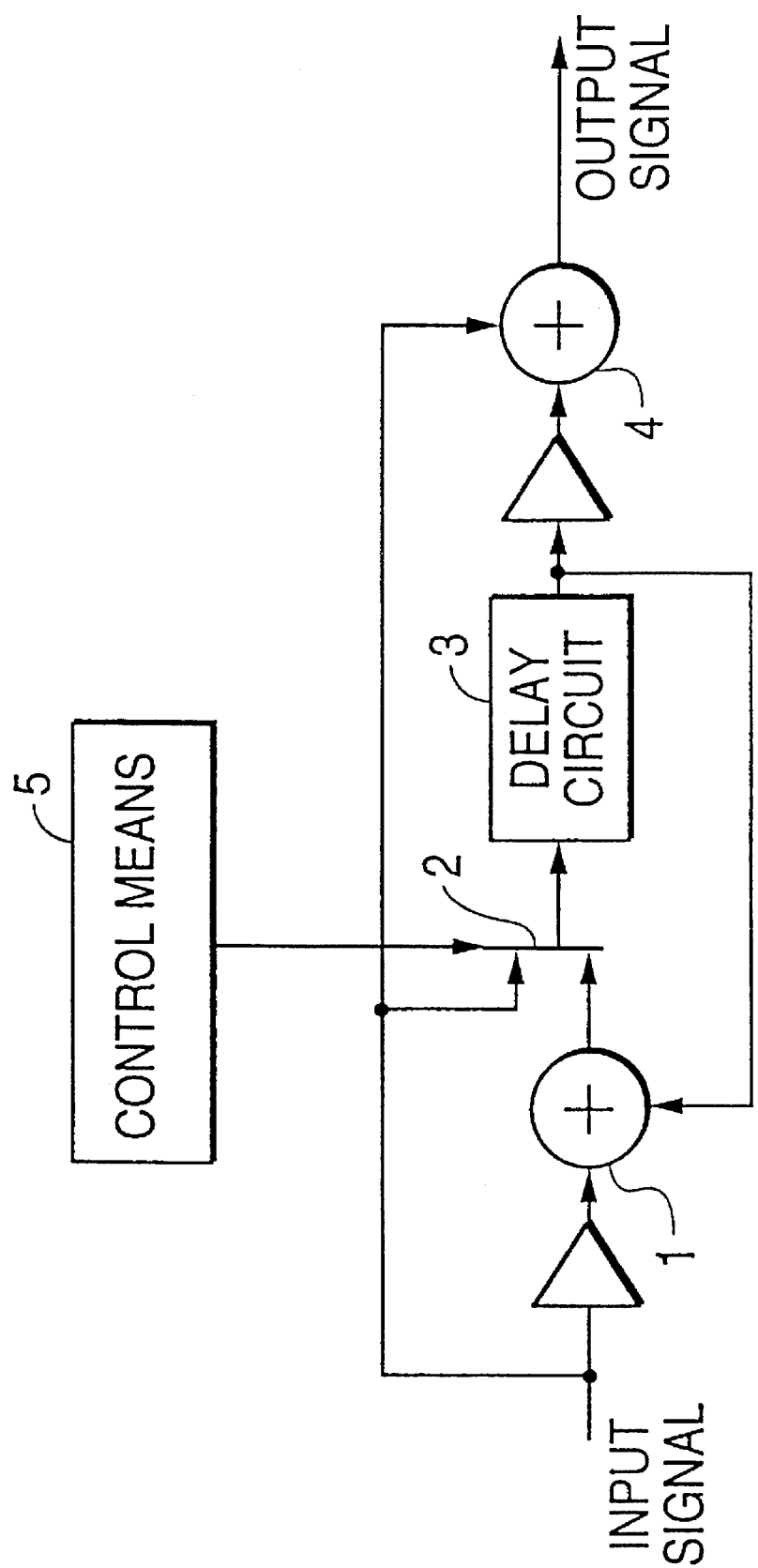
FIG. 1(a) is a block diagram showing an alternative construction of the digital signal processing circuit according to the first embodiment of the present invention.

For the sake of simplicity, the first embodiment describes an example of a thinning filter in which the input signals of three successive perpendicular lines are merely added. However, as shown in FIG. 1(a), when multipliers are provided before each input of the first adder 1 and the second adder 2, a three-tap thinning filter having an optional coefficient is created, in which, for example, a coefficient of a two-line preceding input signal $X_0$ is set to ¼, that of a one-line preceding input signal $X_1$ is set to ¼ and that of a present input signal $X_2$ is set to ¼, as the calculation formula (1) of a picture element value after thinning.

Figure 2:
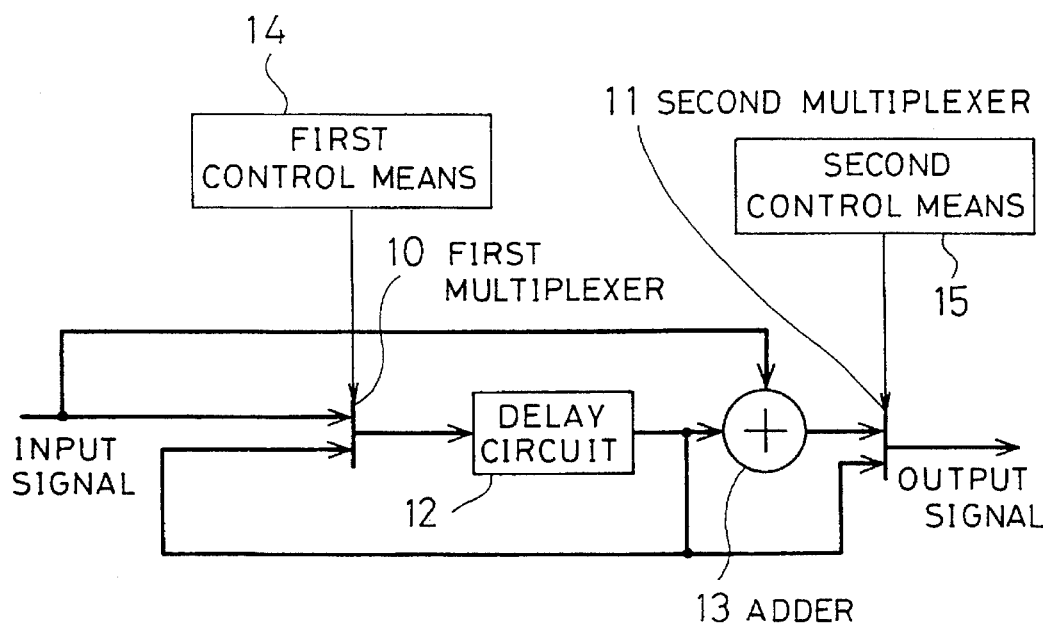
FIG. 2 is a block diagram showing a construction of a digital signal processing circuit according to a second embodiment of the present invention.

FIG. 2 is a block diagram showing the construction of a digital interpolation circuit according to the second embodiment of the present invention. In FIG. 2, reference numeral 10 indicates a first multiplexer, 11 is a second multiplexer, 12 is a delay circuit, 13 is an adder, 14 is a first control means for controlling the first multiplexer 10, and 15 is a second control means for controlling the second multiplexer 11. The first multiplexer 10 receives an input signal and an output of the delay signal 12 and selects one of the input and the output of the delay circuit 12 to output. The second multiplexer 11 receives the output of the adder 13 and the output of the delay circuit 12 and selects one of the output of tile adder 13 and the output of the delay circuit 12 to output. The delay circuit 12 receives and stores the output of the first multiplexer 10 one by one and outputs a previously stored signal. The adder 13 adds the input signal and the output of the delay circuit 12. The First control means 14 switches the first multiplexer 10 alternatively to output either the input signal or the output of the delay circuit 12. The second control means 15 switches the second multiplexer 11 to output the output of the adder 13 when the first multiplexer 10 is switched to output the input signal, and switches the second multiplexer 11 to output the output of the delay circuit 12 when the first multiplexer 10 is switched to output tile output of the delay circuit 12.

The operation of the digital signal interpolation circuit in the second embodiment is now described with reference to FIG. 8. With respect to "FIRST MULTIPLEXER INPUT" in FIG. 8, "INPUT" means an input signal, and "DELAY" means an output signal of the delay circuit 12 in FIG. 2. With respect to "SECOND MULTIPLEXER", "ADDER" means an output of the adder 13 in FIG. 2 and "DELAY" means an output signal of the delay circuit 12.

In FIG. 8, an input signal is input first. Suppose that the image signals exist in even numbered lines such as eighth line, tenth line, twelfth line. Since the input signal exists in the even numbered lines, the signal processing circuit in FIG. 2 outputs an interpolation signal to odd numbered lines. When the input signal is input first to the eighth line, the first multiplexer 10 is switched to output the input signal, so that tile input signal of the eighth line is input and stored to the delay circuit 12. Receiving the input signal thereof, the delay circuit 12 outputs a previously stored input signal of the sixth line to the adder 13. The adder 13 adds the input signal of the sixth line from the delay circuit 12 and the input signal of the eighth line. The second multiplexer 11 is switched to output the output of the adder 13. Accordingly, the output of the signal processing circuit, i.e., the output of the second multiplexer 11 is the sum of the output of the adder 13 (image data of the sixth line) and the image data of the eighth line.

Referring to the next ninth line, with no input signal, the first multiplexer 10 is switched to output the output of the delay circuit 12, and the second multiplexer 11 is switched to output the output of the delay circuit 12. As a result, in the ninth line, the delay circuit 12 outputs the image data of the eighth line and receives the image data of the eighth line which is the output of its own to store the image data of the eighth line again. The output of the second multiplexer 11 is the image data of the eighth line output from the delay circuit 12.

Then, in the tenth line, the first multiplexer 10 is switched to output the input signal, and the second multiplexer 11 is switched to output the output of the adder 13. Accordingly, the delay circuit 12 receives and stores the input signal of the tenth line, and outputs the image data of the eighth line to the adder 13. The adder 13 adds the image data of the eighth line from the delay circuit 12 and the input signal of the tenth line. As a result, the output of the second multiplexer 11 is the sum of the image data of the eighth line and the input signal of the tenth line. Thus, an interpolation signal is output.

Then, at the eleventh line, since nothing is input to the signal interpolation circuit in FIG. 2 with no image signal, the output of the signal interpolation circuit is the output of the delay circuit 12 by switching the second multiplexer 11 to output the output of the delay circuit 12. Thus, the output of the second multiplexer 11 is a one-line preceding input signal, i.e., the image data of the tenth line, as well as in case of the ninth line. Accordingly, in the signal interpolation circuit, the image signal thinned at every two lines in the perpendicular direction to the picture is interpolated.

In the second embodiment, an interpolation filter for merely adding the input signals of the two perpendicular lines is described for the sake of simplicity. When multipliers are provided before each input of the adder 13 and the delay circuit 12 in FIG. 2, a three-tap interpolation filter having an optional coefficient is created, as well as the signal thinning circuit in FIG. 1.

Figure 3:
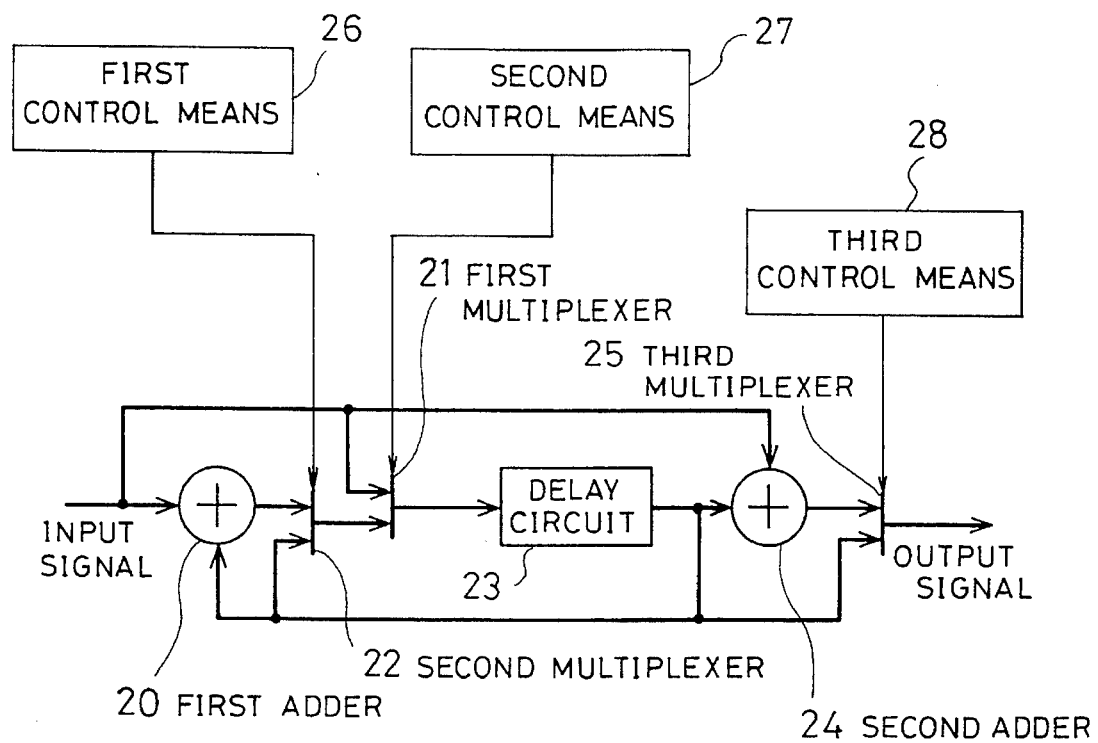
FIG. 3 is a block diagram showing a construction of a digital signal processing circuit according to a third embodiment of the present invention.

FIG. 3 is a block diagram showing a construction of a digital signal thinning/interpolation circuit according to the third embodiment of the present invention. In FIG. 3, reference numeral 20 indicates a first adder, 21 is a first multiplexer, 22 is a second multiplexer, 23 is a delay circuit, 24 is a second adder, 25 is a third multiplexer, 26 is a first control means for controlling the second multiplexer, 27 is a second control means for controlling the first multiplexer 12, and 28 is a third control means for controlling the third multiplexer 25. The thinning/interpolation circuit in the third embodiment is a combination of the digital signal thinning circuit in the first embodiment and FIG. 1 and the digital signal interpolation circuit in the second embodiment and FIG. 2.

In detail, for a signal thinning process using the circuit, the second multiplexer 22 is fixed to output the output of the first adder 20, and the third multiplexer 25 is fixed to output the output of the second adder 24. In this case, the first adder 20 serves as the first adder 1 in FIG. 1, the first multiplexer 21 serves as the multiplexer 2 in FIG. 1, the delay circuit 28 serves as the delay circuit in FIG. 1, and the second adder 24 serves as the second adder 4 in FIG. 1. The first multiplexer 21 is alternatively switched at every input of the input signal to output either the input signal or the output of the second multiplexer 22.

On the other hand, for a signal interpolation process using the circuit, the second multiplexer 22 is fixed to output the output of the delay circuit 23. In this case, the first multiplexer 21 serves as the first multiplexer 10 in FIG. 2, the delay circuit 23 serves as the delay circuit 12 in FIG. 2, the second adder 24 serves as the adder 13 in FIG. 2, and the third multiplexer 25 serves as the second multiplexer 11 in FIG. 2. When an input signal is input, the first multiplexer 21 is switched to output the input signal and the third multiplexer 25 is switched to output the output of the second adder 24. When a next input signal is input, the first multiplexer 21 is switched to output the output of the second multiplexer 22 and the third multiplexer 25 is switched to output the output of the delay circuit 23. The switchings are repeated.

Figure 3A:
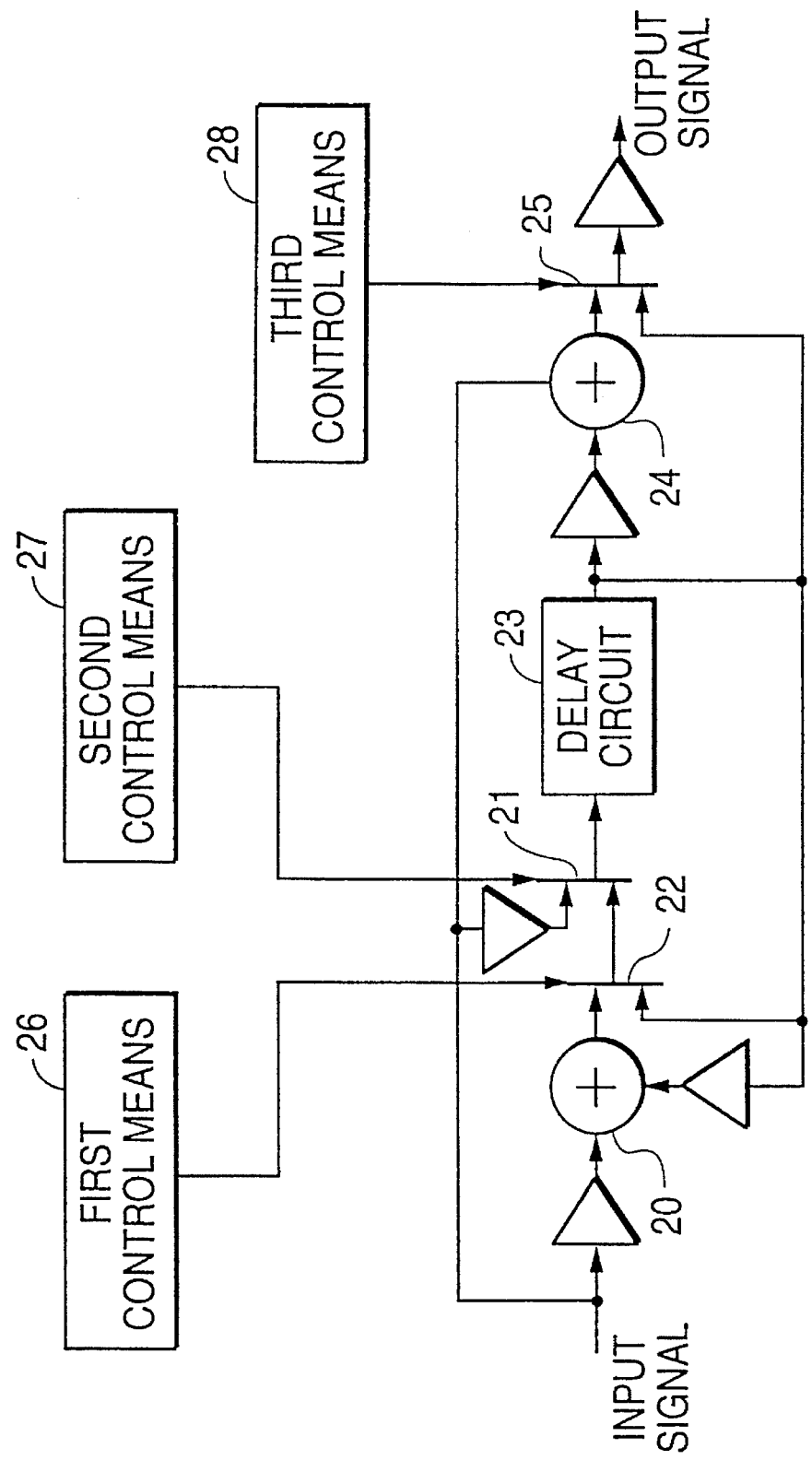
FIG. 3(a) is a block diagram showing an alternative construction of the digital signal processing circuit according to the present invention.
Figure 5B:
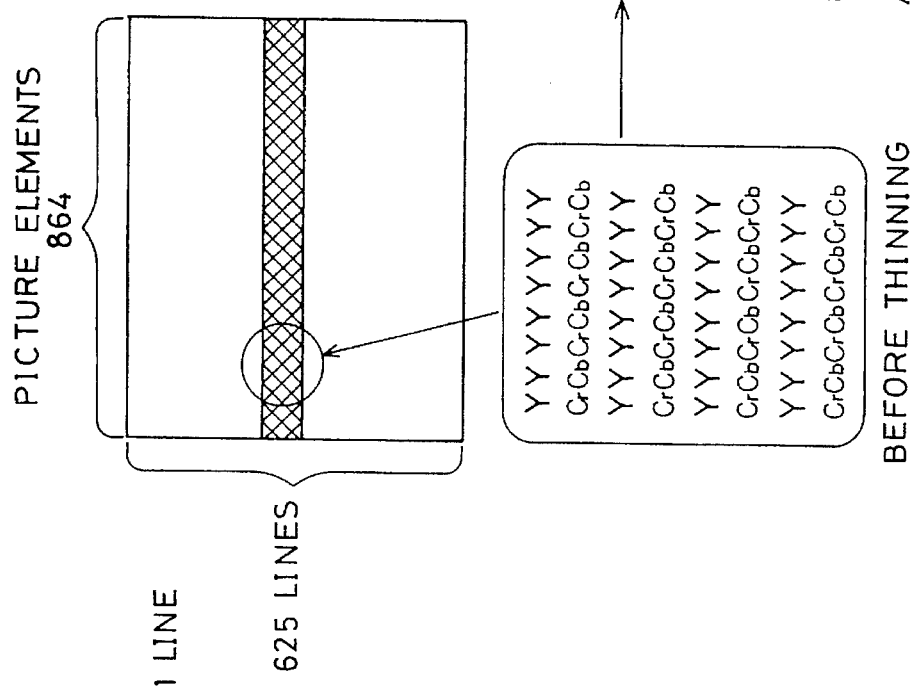
FIGS. 5(a) and 5(b) are explanatory drawings respectively showing an image signal thinning method in the NTSC method and the PAL method.
Figure 5A:
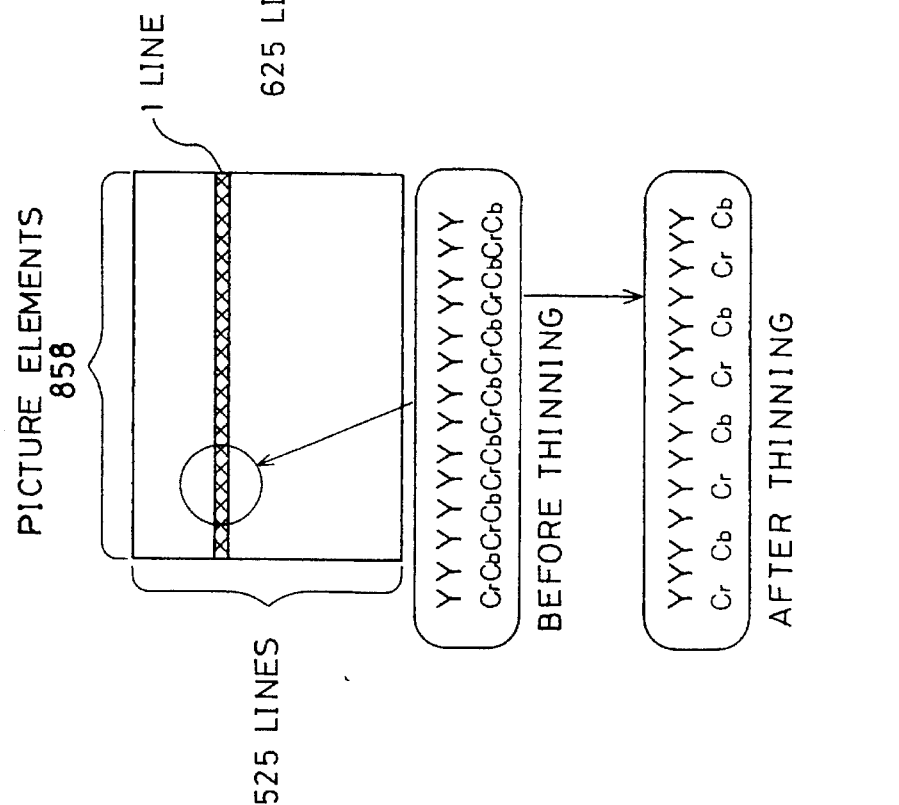
Figure 6A:
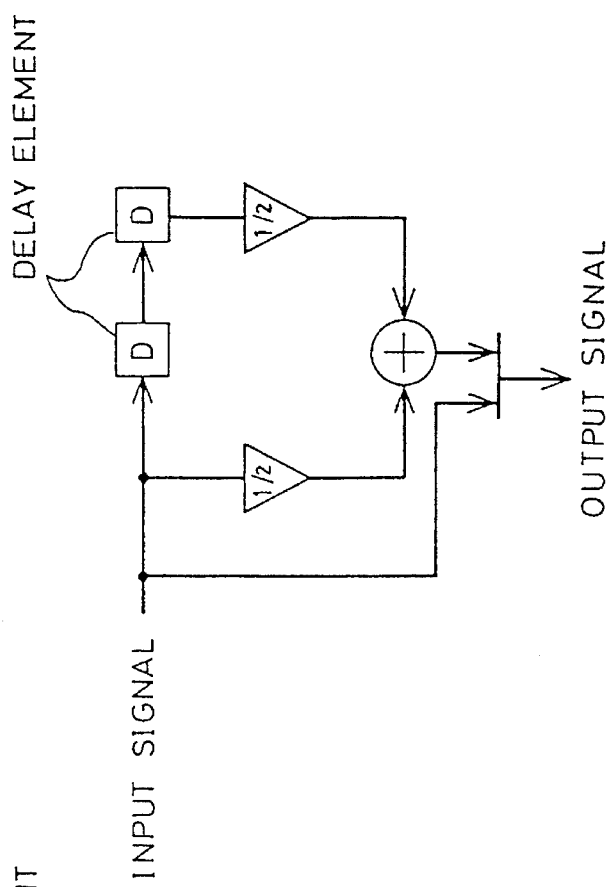
FIGS. 6(a) and 6(b) are block diagrams respectively showing conventional three-tap thinning and interpolation methods for an image signal.
Figure 6B:
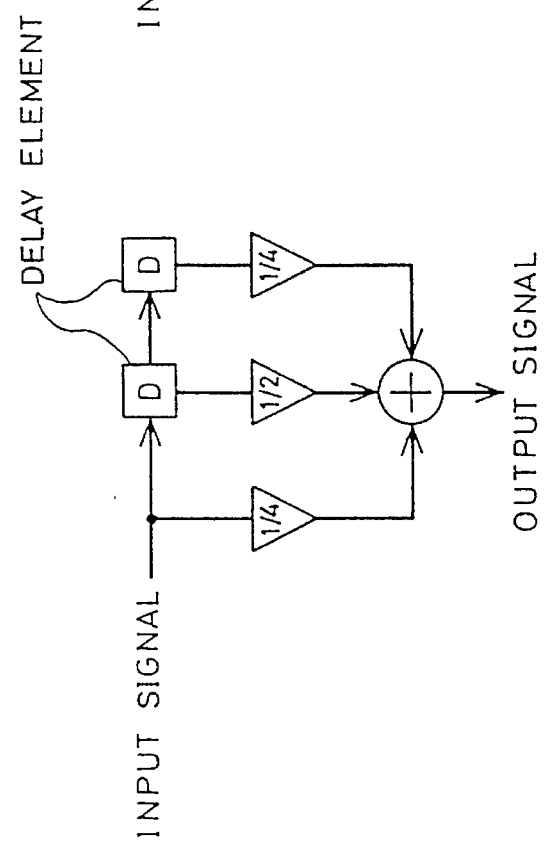

Using the above operation, the digital signal processing circuit in the third embodiment performs the same operation as the thinning circuit in the first embodiment and in FIG. 1 for signal thinning processing, and performs the same operation as the interpolation circuit in the second embodiment and in FIG. 2 for signal interpolation processing. As shown in FIG. 3(a), multipliers can be added to the circuit of the third embodiment as described above for the first and second embodiments.

Figure 9:
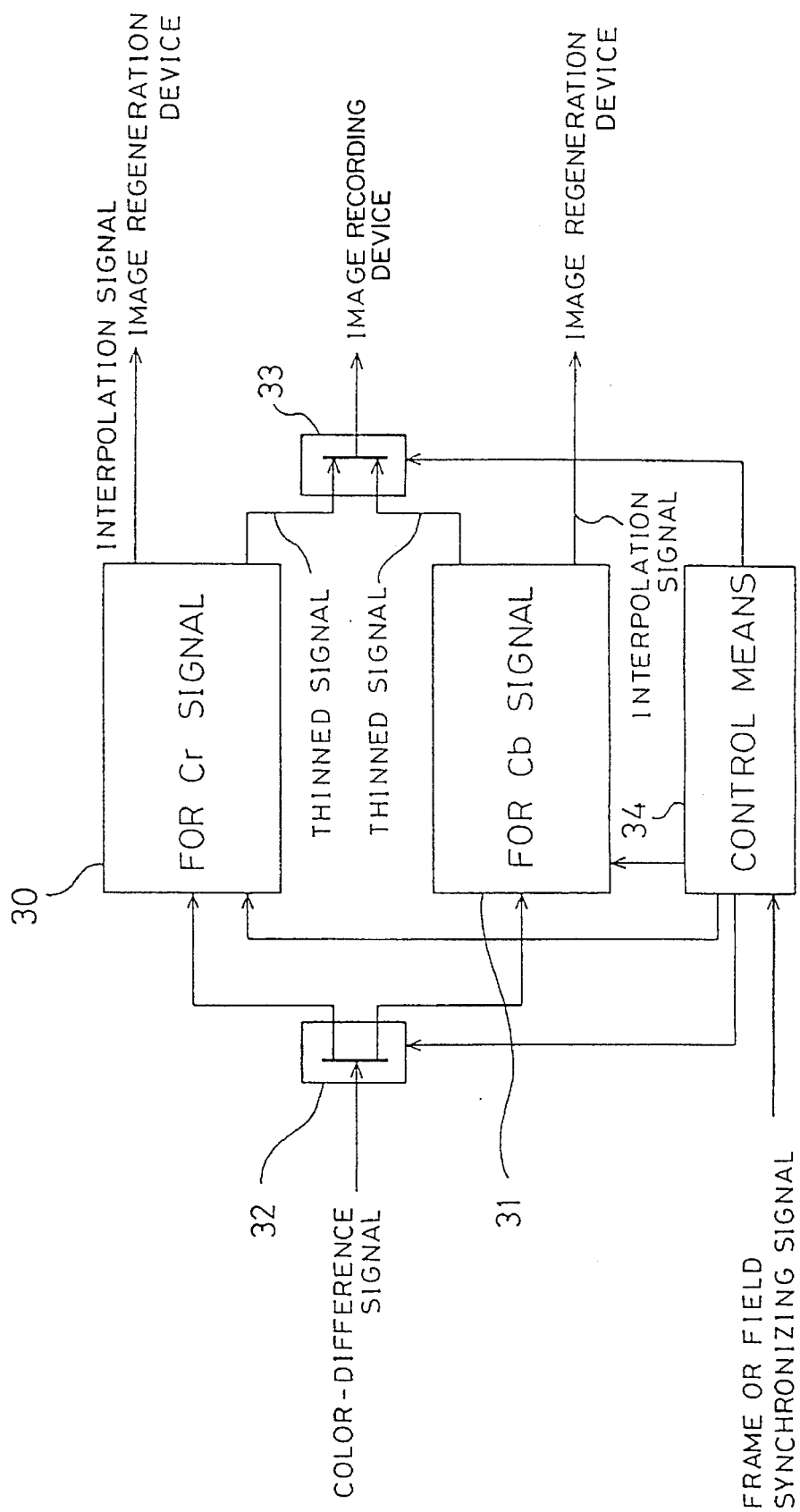
FIG. 9 is a block diagram showing a whole construction of a digital signal processing circuit in a fourth embodiment of the present invention.
Figure 10:
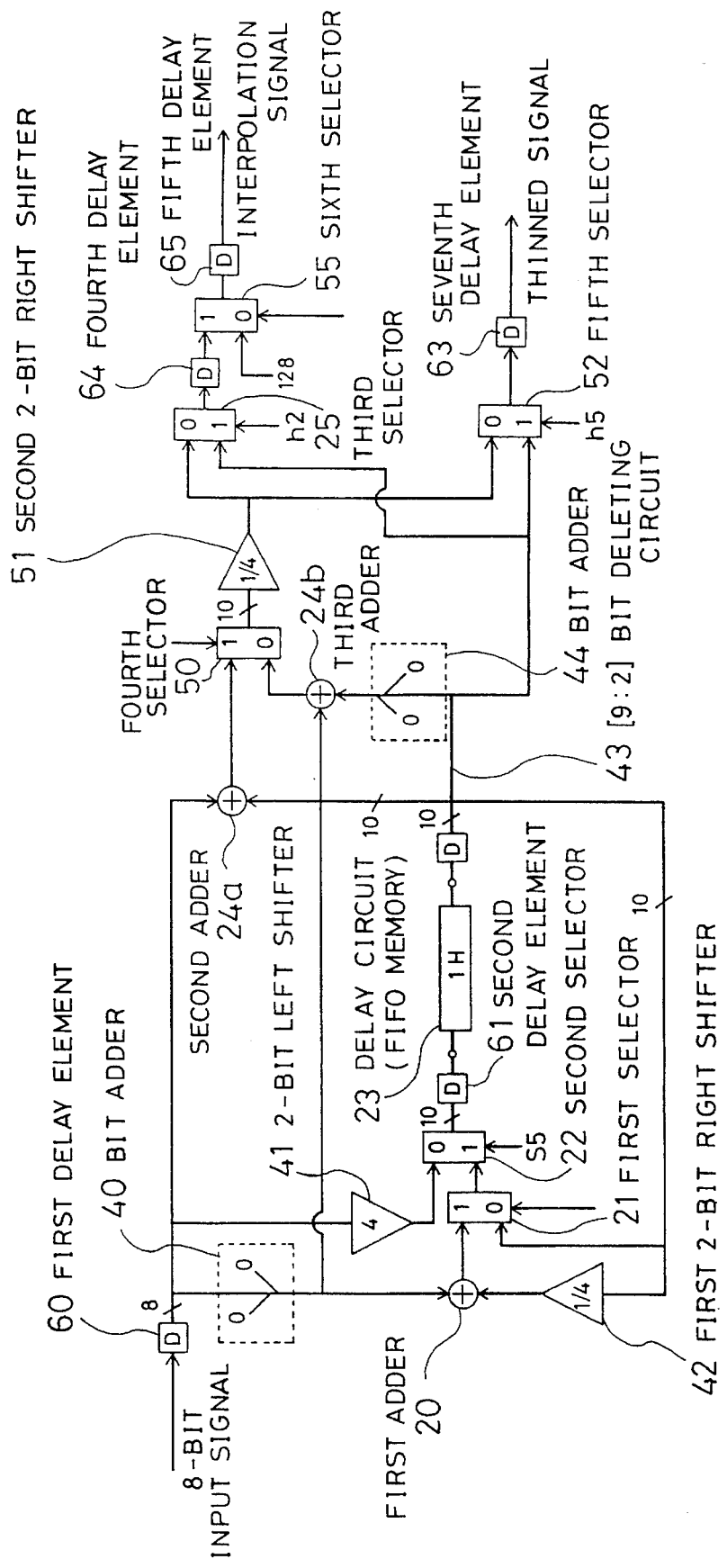
FIG. 10 is a block diagram showing a signal thinning/interpolation circuit which composes a part of the digital signal processing circuit in the fourth embodiment of the present invention.

FIGS. 9 and 10 show the fourth embodiment of the present invention which illustrates an image signal thinning/interpolation circuit. According to the circuit in FIGS. 9 and 10, an 8-bit image signal is thinned based on formula (3):

$$Y=(z^{-2}X_0 \times 2 + z^{-1}X_1 + X_2)/4 \tag{3}$$

and is interpolated based on formula:

$$Y=(z^{-2}X_0 + X_2)/2 \tag{4}$$

In FIG. 9, reference numeral 30 indicates a perpendicular thinning/interpolation circuit for a color-difference signal Cr. The detailed construction thereof is shown in FIG. 10. Reference numeral 31 indicates a perpendicular thinning/interpolation circuit for a color-difference signal Cb which has the same construction as the circuit 30 for the color-difference signal Cr and is shown in FIG. 10.

Reference numeral 32 indicates a first multiplexer which receives the color-difference signals Cr, Cb as input signals and selects therebetween. When the color-difference signal Cr is selected, the first multiplexer 32 outputs the color-difference signal Cr to the perpendicular thinning/interpolation circuit 30 for the color-difference signal Cr. When the color-difference signal Cb is selected, the first multiplexer 32 outputs the color-difference signal Cb to the perpendicular thinning/interpolation circuit 31 for the colordifference signal Cb. Reference numeral 33 is a second multiplexer which receives a thinned signal output from the circuit 30 for the color-difference signal Cr and a thinned signal output from the circuit 31 for the color-difference signal Cb as input signals, and selects one of the thinned signals to output to an image record device for record. Interpolation signals output from the two perpendicular thinning/interpolation circuits 30, 31 are output directly to an image replay device.

Reference numeral 34 indicates control means which receives a frame or field synchronizing signal of an image. Provided inside thereof (not shown) is a horizontal counter for counting in a horizontal direction the number of picture elements in one line For one image according to the input synchronizing signal and a perpendicular counter for counting the number of perpendicular lines at every time when the horizontal counter counts up all picture elements (864) in one line. The control means 34 controls first and second multiplexer 32, 33 and two perpendicular thinning/interpolation circuits 30, 31 based on the count of horizontal and perpendicular counters therein.

Described next is the perpendicular thinning/interpolation circuit 30 for the color-difference signal Cr shown in FIG. 10. Since the other perpendicular thinning/interpolation circuit 31 for the color-difference signal Cb has the same construction, the explanation thereof is dispensed with. Since the perpendicular thinning/interpolation circuit 30 in FIG. 10 has a concrete construction of the perpendicular thinning/interpolation circuit in FIG. 3, the respective identical reference numbers are used to identify identical elements.

In FIG. 10, reference numeral 20 indicates a first adder, 21 is a first multiplexer (herein after multiplexer is referred to as selector), 22 is a second selector, 23 is a delay circuit composed of a FIFO memory, 24a is a second adder for thinning, 24b is a second adder for interpolation, 25 is a third selector.

Reference numeral 40 indicates a bit adder for adding a most significant bit and a least significant bit to an 8-bit input signal. Reference numeral 41 is a 2-bit left shifter for shifting the input signal two bits to left, 42 is a first 2-bit right shifter for shifting a signal outputted from the delay circuit 23 two bits to right, 43 is a bit deleting circuit for deleting lower two bits of the signal outputted from the delay circuit 23 for multiplying by ¼, and 44 is a bit adder for adding a most significant bit and a least significant bit to an output from the bit deleting circuit 43.

Reference numeral 50 indicates a fourth selector for thinning and interpolation for selecting one of an output from the second adder 24a for thinning and an output from the second adder 24b for interpolation, 51 is a second 2-bit right shifter for shifting an output of the fourth selector 50 two bits to right, and 52 is a fifth selector for selecting one of an output from the fourth selector which is shifted two bits to the right by the second 2-bit right shifter 51 and a signal that the lower two bits of an output of the delay circuit 23 are deleted by the bit deleting circuit 43. An output of the fifth selector 52 is inputted to the second selector 33 in FIG. 9 as a thinned signal.

Reference numeral 55 indicates a sixth selector for a horizontal eclipsing. When an interpolation signal output from the third selector 25 is within an eclipsing region shown in FIG. 4, the sixth selector 55 is switched to "128" side whose input is a complement of "2" to cut the output of the interpolation signal based on an output of the horizontal counter in the control means 34 in FIG. 9, and outputs "0" instead of the interpolation signal. An output of the sixth selector 55 is input to the image regeneration device as the interpolation signal.

In FIG. 10, reference numerals 60–65 are delay elements as latch circuits for synchronization. Numerals such as "8", "10" in FIG. 10 express bit numbers of the signals near the numerals.

Operation of the perpendicular thinning/interpolation circuit 30 for the color-difference signal Cr in FIG. 10 is described next.

For the thinning process, the first selector 21 and the fourth selector 50 are switched to HIGH, so that the first selector 21 outputs the output of the first adder 20 and the fourth selector 50 outputs the output of the second adder 24a for thinning. Suppose that a control signal for the second selector 22 is s5, that for the third selector 25 is h2 and that For the fifth selector 52 is h5. Relationship between the control signals for the selectors and the perpendicular line of an effective image of an input signal for the thinning process is indicated in FIG. 11(a). At the thinning process in FIG. 12, the thinned signal is required at even numbered lines, and such as second line, fourth line.

Signal flow is described with reference to FIGS. 10, 11(a) and 12. Initially, a color-difference signal Cr of the first Nine which is a perpendicular line of the image is input. The input is expressed as R1 and an input in an n-th perpendicular line is expressed as Rn of 8-bit data signal. In the first line, the control signal s5 for the second selector 22 is "0", R1 becomes R100 of 10-bit signal by shifting two bits to left by the 2-bit left shifter 41, namely is multiplied by 4, then input and stored in the delay circuit 23.

In the second line, since the control signal s5 is "0", as well as the above, R2 is multiplied by 4 to be R200, and input and stored in the delay circuit 23. The delay circuit 23 outputs R100 which is multiplied by 4. The output of the delay circuit 23 has 8 bits from ninth bit to second bit by deleting the lower two bits thereof by the bit deleting circuit 43, namely becomes R1 which is multiplied by ¼. Since the control signal h5 for the fifth selector 52 is "1" in first to third lines, R1 from the bit deleting circuit 43 is outputted from the fifth selector 52 through a later-stage latch circuit 63.

In the third line, R200 which is multiplied by 4 is output from the delay circuit 23, and is multiplied by ¼ by the first 2-bit right shifter 42 to be R2. R2 is then input to the first adder 20. The first adder 20 adds R2 and OR30. R3 is one-bit-shifted to left by multiplying by 2 which is output from the bit adder 40. Since the control signal s5 is "1", the sum of OR30+R2 is output and stored in the delay circuit 23 through the first selector 21. In the third line, after R200 output from the delay circuit 23 is multiplied by ¼ by the bit deleting circuit 43 to be R2, R2 is output from the fifth selector 52 via the later-stage latch circuit 63. In the third line, R2 is output as a thinned signal to the image recording device via the second multiplexer 33 in FIG. 9, but the image recording device bars the input of the thinned signal of the third line which is an odd numbered line.

In the fourth line, since the control signal h5 for the fifth selector 52 is "0", the second adder 24a for thinning adds OR30+R2 output from the delay circuit 23 (an added result of OR30 which is multiplied by 2 and R2) and the input signal R4. The added signal OR30+R2+R4 passes through the Fourth selector 50, is multiplied by ¼ by the second 2-bit right shifter 51, then is output through the fifth selector 52 as a thinned signal. In other words, the signal (OR30+R2+ R4)/4 output from the fifth selector 52 is ¼-times R2, ½-times R3 and ¼-times R4. Accordingly, the circuit in FIG. 10 in the fourth embodiment contemplates a perpendicular thinning of the image signal based on the formula (3).

The interpolation process with the circuit in FIG. 10 is described with reference to FIGS. 10, 11(*b*) and 12, as well as in the thinning process. The first selector 21 is switched to output the output of the delay circuit 23, and the fourth selector 50 is switched to output the output of the second adder 24*b* for interpolation.

First, in the first line, since the control signal s5 For the second selector 22 is "0", the second selector 22 is switched to output the output of the 2-bit left shifter 41. The input signal R1 is multiplied by 4 by the 2-bit left shifter 41 to be R100, as well as in the thinning process, then is input and stored in the delay circuit 23.

in the second line, since the control signal h2 for the third selector 25 is "1", the third selector 25 is switched to output the output of the delay circuit 23. The output signal R100 of the delay circuit 23 becomes R1 by deleting the lower two bits thereof by the bit deleting circuit 43, then output through third and sixth selectors 25, 55. For the interpolation process, a horizontal eclipsing is inserted to the output signal as the image signal, using the sixth selector 55. In the second line, since the control signal s5 for the second selector 22 is "1" and the second selector 22 is switched to output the output of the first selector 21, i.e., the output of tile delay circuit 23, the output R100 of the delay circuit 23 (R1 is multiplied by 4) is input to the delay circuit 23 via first and second selectors 21, 22. For the interpolation process, in the second line, there is usually no input signal to the circuit.

In the third line, since the control signal h2 for the third selector 25 is "0", the third selector 25 is switched to output the output of the fourth selector 50, i.e., the output of the second adder 24*b* for interpolation. Thus, the output signal is a signal that the output of the second adder 24*b* for interpolation is multiplied by ¼ by the second 2-bit right shifter 51. In other words, the output signal R100 from the delay circuit 23 becomes R1 by deleting the lower two bits thereof by the bit deleting circuit 43, becomes OR10 by adding the most significant bit and the least significant bit thereto by the bit adder 44, then is input to the second adder 24*b* for interpolation. Then, the adder 24*b* adds the signal OR10 and OR30 that the most significant bit and the lease significant bit are added to the input signal R3 by the bit adder 40. The added result is multiplied by ¼ by the second 2-bit right shifter 51 to be (R1+R3)/2, i.e., an added value of ½ of R1 and ½ of R3, then output as the interpolation signal.

As described above, with the circuit in FIGS. 9 and 10 in the fourth embodiment of the present invention, a perpendicular thinning circuit and a perpendicular interpolation circuit applied in the PAL method are easily combined using only one delay circuit 23 for storing the picture elements for one line.

In the above description, the present invention is applied to a perpendicular thinning circuit and a perpendicular interpolation circuit using the PAL method. However, the present invention is not limited to the circuit in PAL method but also applicable to a case where an image signal is recorded by thinning in the perpendicular direction, such as in a high definition television.

We claim:

1. A vertical filter for receiving a plurality of horizontal data lines as an input signal and for producing a vertically filtered signal of said input signal, comprising:

a first adder having said input signal as an input;

a second adder having said input signal as an input;

a multiplexer having as one of its inputs an output of said first adder and having as another of its inputs said input signal;

a delay circuit having as its input an output of said multiplexer, an output of said delay circuit serving as an input to said first adder and said second adder; and a control means for switching at every horizontal line said multiplexer such that its output is either said input signal or said output of said first adder.

2. A vertical filter for receiving a plurality of horizontal data lines as an input signal and for producing a first filtered signal and a second filtered signal of said input signal, comprising:

a first adder, a first multiplexer, and a second adder each receiving as an input said input signal;

a delay circuit for receiving and storing an output of said first multiplexer, said delay circuit producing an output which is received by said first adder and said second adder;

a second multiplexer having as its inputs said output of said delay circuit and an output of said first adder, an output of said second multiplexer being an input to said first multiplexer;

a third multiplexer having as its input said output of said delay circuit and an output of said second adder;

a first control means controlling said second multiplexer to output either said output of said first adder or the contents of said delay circuit;

a second control means for switching said first multiplexer to output either said input signal or said second multiplexer output alternately at each horizontal line of data of said input signal;

a third control means for controlling said third multiplexer to output said output of said second adder when said second multiplexer outputs said output of said first adder and for controlling said third multiplexer to output, when said second multiplexer outputs said delay circuit contents, said output of said second adder when said first multiplexer outputs said input signal and said third multiplexer to output said delay circuit contents when said first multiplexer outputs said delay circuit contents.

3. The vertical filter of claims 1 or 2, wherein the vertical filter is used for an image signal of a television using the PAL method.

4. The vertical filter of claim 2, further comprising a multiplexer for inhibiting output of a second filtered signal when the second filtered signal is within an eclipsing region of an image.

5. The vertical filter of claim 1, wherein the control means for controlling the multiplexer includes a counter controlled by a frame synchronizing signal or a field synchronizing signal of an image.

6. The vertical filter of claims 1 or 2, further comprising an image recording device for storing an output of said vertical filter, wherein the image recording device inhibits input of a signal other than the first filtered signal to said image recording device.

7. The vertical filter of claims 1 or 2, further comprising a signal thinning circuit or a signal interpolation circuit for filtering two kinds of color-difference signals out of the input signal individually.

8. The vertical filter of claim 1, further comprising a plurality of multipliers, respectively provided at the input of said first adder and the input of said second adder, for dividing values of signals input to the respective adders by an arbitrary integer.

9. The vertical filter of claim 2, further comprising a plurality of multipliers, respectively provided at said input signal input to said first adder, said input signal input to said first multiplexer, said output of said delay circuit received by said second adder, said output of said delay circuit received by said first adder, and said output of said third multiplexer, said multipliers respectively dividing values of said signals input to the adder by an arbitrary integer.

10. The vertical filter of claim 2, wherein each control means for controlling each multiplexer includes a counter controlled by a frame synchronizing signal or a field synchronizing signal of an image.

* * * * *

UNITED STATES PATENT AND TRADEMARK OFFICE
CERTIFICATE OF CORRECTION

PATENT NO. : 5,495,296
DATED : February 27, 1996
INVENTOR(S) : Dosho, et. al.

It is certified that error appears in the above-identified patent and that said Letters Patent is hereby corrected as shown below:

Column 1, line 9, change "for filtering of" to --for--;
　　　　　line 14, change "of an" to --an--; and
　　　　　line 30, change "For" to --for--.

Column 2, line 23, change "(1), (2)" to --(1) and (2)--.

Column 3, line 26, change "First" to --first--;
　　　　　line 34, change "and or" to --or the--;
　　　　　line 40, change "off" to --of--; and
　　　　　line 45, change "off" to --of--.

Column 4, line 23, change "at both" to --both--.

Column 6, line 8, change "tile" to --the--;
　　　　　line 10, change "tile" to --the--;
　　　　　line 54, change "tile" to --the--;
　　　　　line 59, change "First" to --first--; and
　　　　　line 67, change "tile" to --the--.

Column 7, line 16, change "tile" to --the--.

UNITED STATES PATENT AND TRADEMARK OFFICE
CERTIFICATE OF CORRECTION

PATENT NO. : 5,495,296
DATED : February 27, 1996
INVENTOR(S) : Dosho, et. al.

It is certified that error appears in the above-identified patent and that said Letters Patent is hereby corrected as shown below:

Column 8, line 18, change "28" to --23--;
    line 19, change "circuit" to --circuit 3--; and
    line 54, change "$Y=(z^{-2}X_0X2+z^{-1}X_1+X_2)/4$" to --$Y=(z^{-2}X_0+2Xz^{-1}X_1+X_2)/4$--.

Column 9, line 20, change "For" to --for--; and
    line 42, change "25" to --and 25--.

Column 10, line 22, change "For" to --for--;
    line 26, change "lines, and" to --lines,--;
    line 27, change "line," to --line and--; and
    line 29, change "Nine" to --line--.

Column 11, line 1, change "Fourth" to --fourth--;
    line 14, change "For" to --for--;
    line 19, change "in" to --In--;
    line 29, change "tile" to --the--; and
    line 46, change "lease" to --least--.

On the Cover Page:

In the Abstract, line 3, change "adder and" to --adder,--.

Signed and Sealed this

Twenty-seventh Day of June, 2000

Attest:

Q. TODD DICKINSON

*Attesting Officer*      *Director of Patents and Trademarks*